(12) United States Patent
Cromwijk

(10) Patent No.: US 6,632,081 B2
(45) Date of Patent: Oct. 14, 2003

(54) ASSEMBLY OF A COOLING UNIT AND A MOLD

(75) Inventor: Jan Willem Cromwijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 53 days.

(21) Appl. No.: 09/826,683

(22) Filed: Apr. 5, 2001

(65) Prior Publication Data

US 2001/0042815 A1 Nov. 22, 2001

(30) Foreign Application Priority Data

May 19, 2000 (EP) .............................. 00201996

(51) Int. Cl.[7] .............................................. B29C 45/73
(52) U.S. Cl. ..................... 425/547; 425/548; 425/552
(58) Field of Search ................................ 425/547, 548, 425/552

(56) References Cited

U.S. PATENT DOCUMENTS

| 3,404,974 A | * | 10/1968 | Belentepe et al. |
| 4,032,317 A | | 6/1977 | Carmi et al. .................. 65/161 |
| 5,783,233 A | * | 7/1998 | Takahashi ................... 264/107 |

* cited by examiner

*Primary Examiner*—Tim Heitbrink

(57) ABSTRACT

A mold and an assembly of a device for cooling a mold include an annular channel system that surrounds the mold. The channel system has a channel having at least one entrance for supplying a cooling medium to the interior of the channel. The channel has at least one mold-facing outlet aperture for the cooling medium. The channel is adapted for substantially one tangential flow direction of the cooling medium around the mold.

Figure 1:
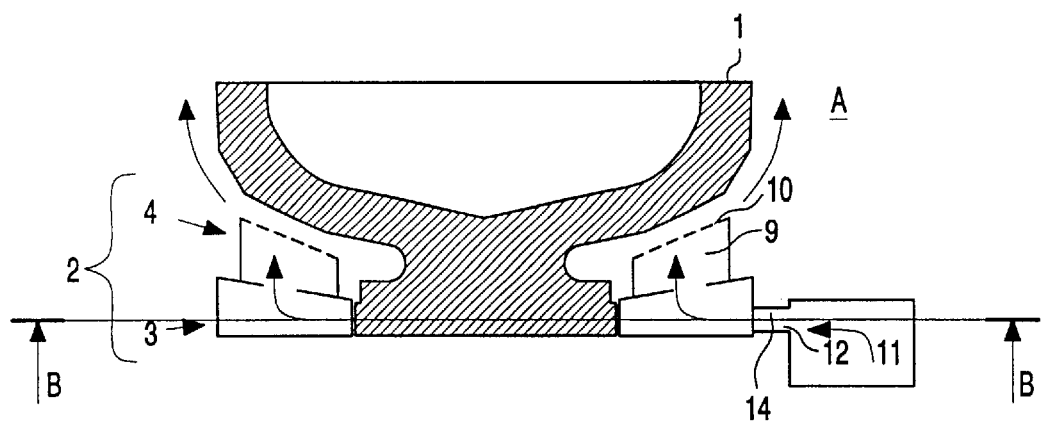

20 Claims, 2 Drawing Sheets

ASSEMBLY OF A COOLING UNIT AND A MOLD

FIELD OF TECHNOLOGY

The invention relates to an assembly of a device for cooling a mold, and a mold, said device comprising an annular channel system which surrounds the mold, the channel system comprising a channel having at least one entrance for supplying a cooling medium to the interior of the channel, the channel having at least one mold-facing outlet aperture for the cooling medium.

The invention also relates to a device for cooling a mold.

BACKGROUND AND SUMMARY

Such an assembly is described in, for example, United States patent U.S. Pat. No. 4,032,317. This United States patent describes a device for distributing and controlling the flow of a cooling medium along different parts of a mold. To this end, the cooling medium is introduced into an annular chamber surrounding the base of the mold. The cooling medium can leave the chamber via outlet apertures, perforated partitions and a large number of control valves for selectively adjusting and directing the flow of the cooling medium along different parts of the mold. The temperature of different parts of the mold can be controlled selectively by means of the known device.

The combination of a device for cooling a mold and a mold, as described above, is used, inter alia, for manufacturing glass parts for a display tube such as the screen and the cone.

Practice proves that the use of the known device often leads to a non-uniform cooling of the mold.

It is an object of the invention to provide an assembly of a device for cooling a mold, and a mold, with which a more uniform cooling of the mold is obtained in a simple manner.

In an assembly of a device for cooling a mold, and a mold, this object is achieved in that the channel is adapted for substantially one tangential flow direction of the cooling medium around the mold.

The customary device leads to a flow pattern in which the cooling medium, on its way to the outlet aperture, flows through the channel partly clock-wise and partly counter clock-wise with respect to the mold. Consequently, pressure differences in the annular channel system may arise, inter alia, at the areas where these oppositely directed flows meet each other. These pressure differences may lead to differences in the flow of the cooling medium along the mold. This results in a non-uniform cooling of this mold.

According to the invention, the channel is adapted in such a way that the cooling medium substantially has the same tangential flow direction throughout the channel. Consequently, the tangential component of the flow of the cooling medium is substantially equally directed throughout the channel. As a result, the cooling medium will flow substantially either clock-wise or counter clock-wise in the channel around the mold. This flow pattern in the channel reduces possible pressure differences in the channel so that a more homogeneous cooling is obtained.

In the known assembly, a complicated adjustment of the large number of control valves is necessary if a uniform cooling of the mold is desired. An extra advantage of the assembly according to the invention is that the control valves, and hence their adjustment, can be dispensed with.

The substantially equally directed tangential component of the flow of the cooling medium in the channel ensures a sufficient homogeneous cooling of the mold.

A more homogeneous cooling of the mold can be obtained in a simple manner with the assembly according to the invention. Practice proves that a homogeneous cooling of the mold is favorable for the ultimate physical properties of the glass product which is manufactured in the mold. A non-uniform cooling may lead to said spread of the shape and cause problems when removing the products from the mold.

An embodiment of an assembly according to the invention, in which the channel has a supply channel for the cooling medium, is characterized in that the supply channel substantially tangentially connects to the channel. When the cooling medium flows through the supply channel, the flow direction of the cooling medium in the supply channel will be substantially parallel to this supply channel. At the point where the supply channel connects to the channel, the cooling medium will tend to maintain its flow direction parallel to the supply channel. Due to the measure taken for this embodiment, the cooling medium acquires a substantially tangential flow direction at the point where the supply channel connects to the channel. The channel is further adapted to continue this substantially tangential flow direction substantially throughout the channel. Consequently, the cooling medium will flow around the mold substantially either clock-wise or counter clock-wise in the channel.

The point where the supply channel connects to the channel is preferably located proximate to a side of the channel remote from the mold. The point of connection of the supply channel is preferably located opposite the side of the channel provided with the outlet aperture. These measures contribute to a satisfactory averaging of pressure differences in the channel.

The outlet aperture is preferably located proximate to a side of the channel facing the center of the annular channel system. This measure contributes to a more homogeneous pressure distribution proximate to the outlet aperture and a more homogeneous cooling of the mold, particularly when used in combination with the connection of the supply channel proximate to a side remote from the center of the annular channel system.

A further embodiment of an assembly according to the invention is characterized in that the channel has an exit for the cooling medium, with outlet apertures being located between the entrance and the exit of the channel, and with the surface area of the cross-section of the channel decreasing from the entrance to the exit. The decreasing cross-section of the channel ensures that the tangential velocity component of the cooling medium in the channel is substantially constant. The channel narrows from the entrance to the exit, similarly as in a snail's shell.

The exit of the channel preferably connects to the entrance of the channel. The supply channel and the exit of the channel preferably connect tangentially to the entrance of the channel. The tangential flow direction of the cooling medium in the channel then causes a rotating flow, referred to as vortex or whirl, so that differences in inlet conditions for the cooling medium are averaged and a uniform pressure distribution is obtained around the mold.

With a proper choice of the dimensions of the channel, an approximately free whirl flow occurs in this channel. A whirl flow is a rotating flow with concentric circles as flow lines, in which the tangential flow velocity is inversely proportional to the distance to the center of the circles.

Consequently, the tangential flow velocity of the cooling medium is maximal on the side of the channel facing the center of the annular channel system.

The surface area of the cross-section of the channel preferably continuously decreases in size between the entrance and the exit of the channel. To obtain a uniform pressure distribution in the channel, the surface area of the cross-section of the channel should decrease exponentially on theoretical grounds. However, the differences with a linearly decreasing surface area are so small in practice that a linearly decreasing surface area can be chosen.

An embodiment of an assembly according to the invention is characterized in that the channel system comprises one further channel on a side of the channel facing the mold, with the outlet aperture of the channel terminating in the further channel, the further channel having at least one further outlet aperture on a side facing the mold. The further channel is supplied from the channel having a uniform pressure distribution of the cooling medium around the mold, and subsequently distributes and controls the flow of a cooling medium along different parts of a mold via the further outlet aperture.

These and other aspects of the invention are apparent from and will be elucidated with reference to the embodiments described hereinafter.

Figure 2:
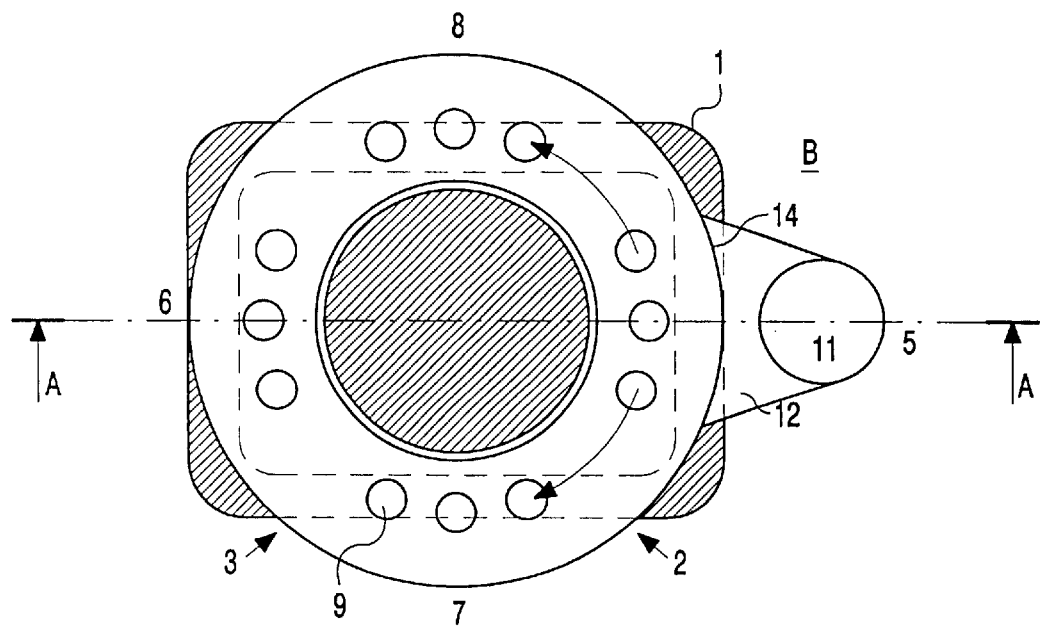
Figure 3:
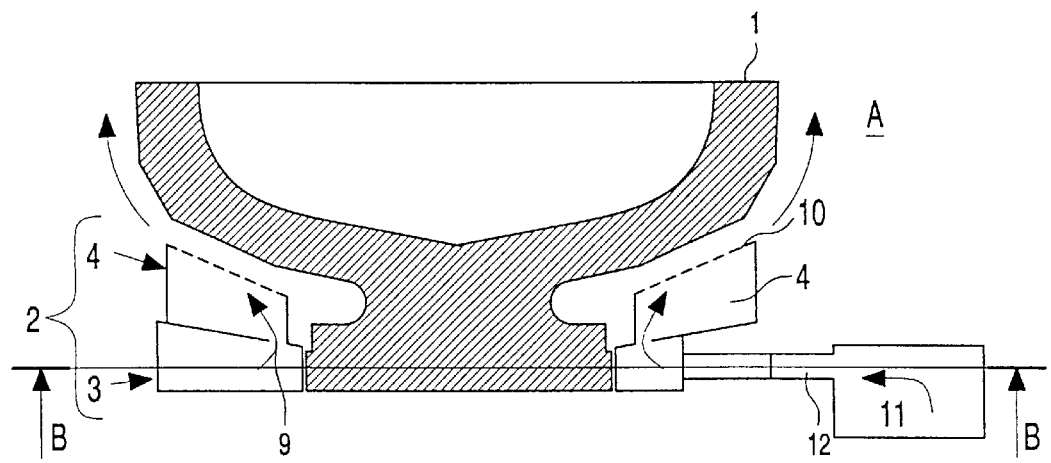
Figure 4:
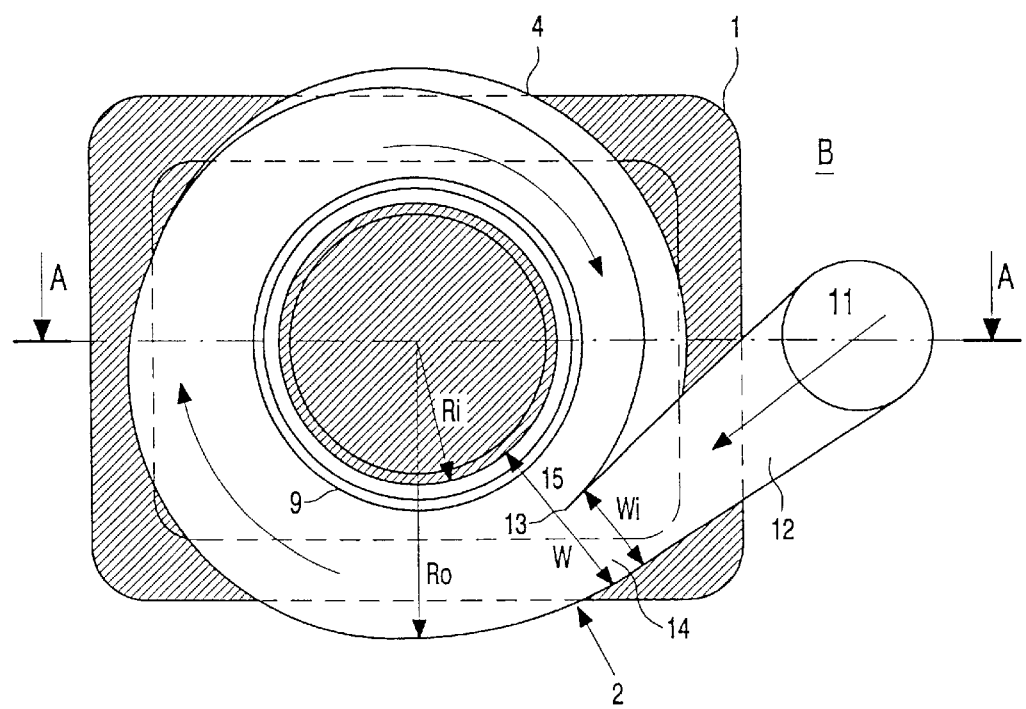

In the drawings:

FIG. 1 shows diagrammatically an embodiment of a known assembly of a device for cooling a mold, and a mold, taken in a cross-section on the line A—A in FIG. 2, FIG. 2 shows diagrammatically an embodiment of a known assembly of a device for cooling a mold, and a mold, taken in a cross-section on the line B—B in FIG. 1, FIG. 3 shows diagrammatically an embodiment of an assembly of a device for cooling a mold, and a mold according to the invention, taken in a cross-section on the line A—A in FIG. 4, and FIG. 4 shows diagrammatically an embodiment of an assembly of a device for cooling a mold, and a mold according to the invention, taken in a cross-section on the line B—B in FIG. 3.

DETAILED DESCRIPTION

When molding glass cones and screens for display tubes (CRTs), the mold 1 is cooled on its outer side by means of a cooling medium, generally in the form of air. This air is supplied, as shown at 11, to a device for cooling the mold in the form of a round cooling box 2. This cooling box 2 often comprises two parts: a channel 3, also referred to as lower box, with which the air is distributed around the mold, and a further channel 4, also referred to as upper box, with which the air is distributed across the outer side of the mold. In known devices for cooling the mold, air is blown radially into the lower box, as is schematically shown in FIGS. 1 and 2. The pressure distribution in the lower box 3 is far from uniform. There are large pressure differences between the front 5 and the back 6 but also between the left 7 and the right 8. Since the upper box 4 is supplied with air through the lower box 3 via the outlet apertures 9, this leads to a non-uniform flow through the upper box 4 and via the further outlet apertures 10 to a non-uniform cooling of the mold 1.

Moreover, there are deviations in the cooling properties between the different cooling boxes on a mold. This is the result of minimal deviations in dimensions and differences of installation between the different cooling boxes 2.

The non-uniform cooling and the mutual variation between different cooling boxes on the mold leads to an uncontrolled molding process. The known cooling box 2 is an important cause of a too large spread of sizes and problems when removing the products from the mold 1.

In accordance with one aspect of the invention, air is blown tangentially into the lower box 3, similarly as in a cyclone, instead of the customary radial blow. This tangential blow causes a rotating flow in the channel 3, referred to as vortex or whirl, so that differences in inlet conditions are averaged and a tangentially uniform pressure distribution in the channel 3 around the mold 1 is obtained.

An embodiment of an assembly of a device for cooling a mold, and a mold according to the invention, is shown diagrammatically in FIGS. 3 and 4. In this embodiment, the lower box 3 has the shape of a "snail's shell", in which the supply channel 12 tangentially connects to the channel on the side remote from the center of the annular channel system. In this embodiment, a slit-shaped outlet aperture 9 is chosen, which runs around the channel on a side facing the center of the annular channel system.

The maximum outer radius of the lower box Ro is determined by the space on the mold. The inner radius of the lower box Ri is determined by the base of the mold 1. At a constant height of the lower box 3, the only parameters which can still be freely chosen are the width Wi of the entrance of the channel 14 and the shape of the "snail's shell".

A narrow entrance 14 (small Wi with respect to W) yields a high inflow velocity (at a given rate) with a high pressure drop, but has the advantage of a very uniform tangential pressure distribution. A wide entrance 14 (large Wi with respect to W) yields a low pressure drop but has the risk of a less uniform pressure distribution: the influence of the "tongue" 13 may still be noticeable in the outlet area. Based on estimations, a ratio of between 0.5 and 0.7 between the width of the entrance of the channel Wi and the total width W is recommended.

The embodiment shows a channel which has an exit 15 for the cooling medium, connecting to the entrance 14 of the channel 13. Moreover, the surface area of the cross-section of the channel 3 decreases from entrance 14 to exit 15, with which the characteristic "snail's shell" is obtained. To obtain a uniform pressure distribution in a channel, the surface area of the cross-section of the lower box 3 should theoretically decrease exponentially. At a constant height of the lower box 3 and a constant inner radius Ri, this means that the outer radius Ro should decrease exponentially from the entrance 14 to the exit 15. However, the differences with a linearly decreasing outer radius Ro are so small in practice that a linearly decreasing outer radius Ro can be chosen.

In the embodiment of a cooling box according to the invention, the upper box 4 (FIGS. 3 and 4) is equal to the known upper box 4 (FIGS. 1 and 2).

It will be evident that many variations are possible within the scope of the invention. For example, the local shape of the cross-section of the channel 3 (square, rectangular, circular, etc.) will not be relevant to the invention. The above-mentioned embodiments illustrate rather than limit the invention. Those skilled in the art will be capable of conceiving various alternative embodiments within the scope of the appended claims.

Any reference numeral between parentheses in a claim should not be construed as limiting the claim.

In summary, the invention relates to an assembly of a device for cooling a mold, the cooling box 2, and the mold 1. Such a mold 1 for forming glass, such as glass parts for a display tube (for example, screen and cone) is cooled by causing a cooling medium such as water or air to flow around this mold 1. The cooling medium is distributed along different parts of the mold 1 by means of the cooling box 2.

The cooling box 2 according to the invention is adapted in such a way that the tangential component of the flow of the cooling medium is substantially equally directed throughout the channel 3. A method of achieving this is a tangentially oriented inflow of the cooling medium into the channel, instead of the conventional radial inflow. This tangential inflow causes a rotating flow in the channel 3, referred to as vortex or whirl, so that differences in inlet conditions are averaged and a uniform pressure distribution in the channel 3 is obtained. A more homogeneous cooling of the mold 1 can be obtained in a simple manner with the assembly according to the invention.

What is claimed is:

1. An assembly of a device for cooling a mold, and a mold, said device comprising an annular channel system which surrounds the mold, the channel system comprising a channel having at least one entrance for supplying a cooling medium to the interior of the channel, the channel having at least one mold-facing outlet aperture for the cooling medium, wherein the channel is adapted for substantially one tangential flow direction of the cooling medium around the mold.

2. The assembly of claim 1, in which the channel has a supply channel for the cooling medium, wherein the supply channel substantially tangentially connects to the channel.

3. The assembly of claim 1 or 2, wherein the supply channel connects to the channel proximate to a side of the channel remote from the mold.

4. The assembly of claim 1, wherein the outlet aperture is located proximate to a side of the channel facing the center of the annular channel system.

5. The assembly of claim 1, wherein the channel has an exit for the cooling medium, with outlet apertures being located between the entrance and the exit of the channel, and with the surface area of the cross-section of the channel decreasing from the entrance to the exit.

6. The assembly of claim 5, wherein the exit of the channel connects to the entrance of the channel.

7. The assembly of claim 5, wherein the surface area of the cross-section of the channel continuously decreases in size between the entrance and the exit of the channel.

8. The assembly of claim 1, wherein the channel system comprises a further channel on a side of the channel facing the mold, with the outlet aperture of the channel terminating in the further channel, the further channel having at least one further outlet aperture on a side facing the mold.

9. A device for cooling a mold, which device comprises an annular channel system having at least one channel, the channel having at least one entrance for supplying a cooling medium to the interior of the channel, the channel having at least one outlet aperture for the cooling medium, wherein the channel is adapted for a substantially tangential flow direction of the cooling medium.

10. The device of claim 9, wherein the channel is adapted for a gaseous cooling medium.

11. The assembly of claim 3, wherein the outlet aperture is located proximate to a side of the channel facing the center of the annular channel system.

12. The assembly of claim 2, wherein the outlet aperture is located proximate to a side of the channel facing the center of the annular channel system.

13. The assembly of claim 12, wherein the channel has an exit for the cooling medium, with outlet apertures being located between the entrance and the exit of the channel, and with the surface area of the cross-section of the channel decreasing from the entrance to the exit.

14. The assembly of claim 4, wherein the channel has an exit for the cooling medium, with outlet apertures being located between the entrance and the exit of the channel, and with the surface area of the cross-section of the channel decreasing from the entrance to the exit.

15. The assembly of claim 3, wherein the channel has an exit for the cooling medium, with outlet apertures being located between the entrance and the exit of the channel, and with the surface area of the cross-section of the channel decreasing from the entrance to the exit.

16. The assembly of claim 2, wherein the channel has an exit for the cooling medium, with outlet apertures being located between the entrance and the exit of the channel, and with the surface area of the cross-section of the channel decreasing from the entrance to the exit.

17. The assembly of claim 16, wherein the surface area of the cross-section of the channel continuously decreases in size between the entrance and the exit of the channel.

18. The assembly of claim 15, wherein the surface area of the cross-section of the channel continuously decreases in size between the entrance and the exit of the channel.

19. The assembly of claim 14, wherein the surface area of the cross-section of the channel continuously decreases in size between the entrance and the exit of the channel.

20. The assembly of claim 6, wherein the surface area of the cross-section of the channel continuously decreases in size between the entrance and the exit of the channel.

\* \* \* \* \*